US005470183A

United States Patent [19]

Swick

[11] Patent Number: 5,470,183

[45] Date of Patent: Nov. 28, 1995

[54] ELECTRICAL CONNECTION TERMINAL ASSEMBLY AND TILT WASHER

[76] Inventor: E. Grant Swick, 28 W. 629 Stearns Rd., Bartlett, Ill. 60103

[21] Appl. No.: 155,387

[22] Filed: Nov. 22, 1993

[51] Int. Cl.[6] .............................. F16B 33/00; H01R 4/44; H01R 11/01

[52] U.S. Cl. .......................... 411/368; 411/160; 411/533; 411/959; 439/782

[58] Field of Search .................................... 411/160, 161, 411/368, 533, 957, 959; 439/781, 782, 246

[56] References Cited

U.S. PATENT DOCUMENTS

| | | | |
|---|---|---|---|
| 3,398,393 | 8/1968 | Cochrum | 439/782 |
| 3,891,296 | 6/1975 | Gutshall | 439/782 |
| 3,993,397 | 11/1976 | Gutshall | 411/160 X |
| 4,135,777 | 1/1979 | Barth | 439/782 |
| 4,146,289 | 3/1979 | Kirrish | 439/781 X |
| 4,174,148 | 11/1979 | Obuch et al. | 411/160 X |
| 4,310,214 | 1/1982 | Carlson | 439/781 |
| 4,492,422 | 1/1985 | Bieschke | 439/781 X |

*Primary Examiner*—Neill R. Wilson
*Attorney, Agent, or Firm*—J. E. Brunton

[57] ABSTRACT

An electrical terminal clamping assembly of the character that will simultaneously accommodate and securely grip one or more conductor wires of substantially different diameters. The assembly includes a threaded terminal screw and a uniquely configured clamping plate or tilt washer which is adapted to freely tilt relative to the undersurface of the head of the terminal screw in a manner to move gripping projections provided on the undersurface of the washer into secure clamping engagement with a wire of large diameter disposed on one side of the axial center line of the terminal screw and into secure clamping engagement with a wire of much smaller diameter disposed on the opposite side of the axial center line. The undersurface of the tilt washer is provided with uniquely configured, generally circularly shaped gripping protuberances that provide multiple contact points for firmly gripping the different diameter conductor wires which are disposed on opposite sides of the terminal screw.

28 Claims, 6 Drawing Sheets

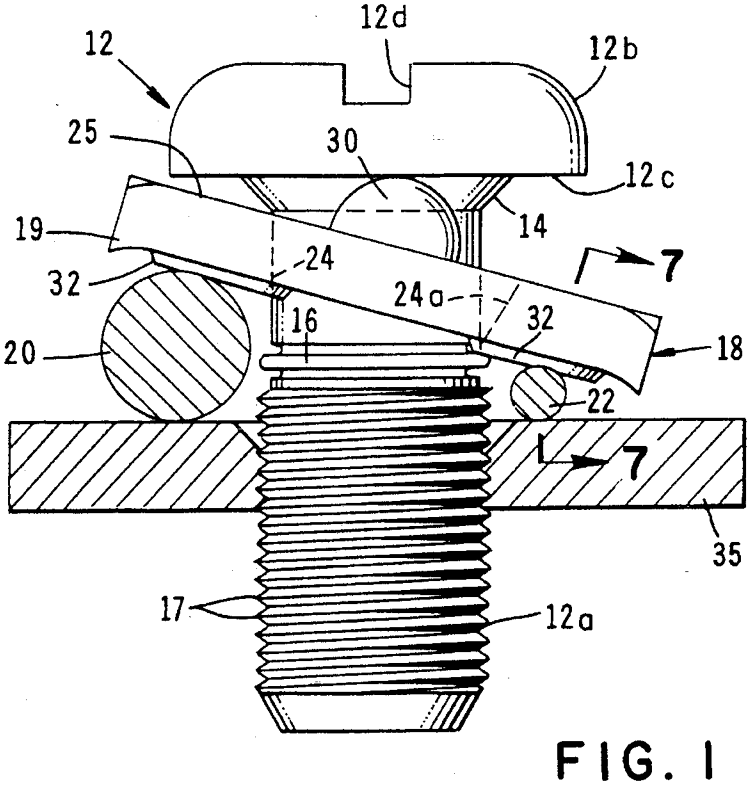
FIG. 1
FIG. 2
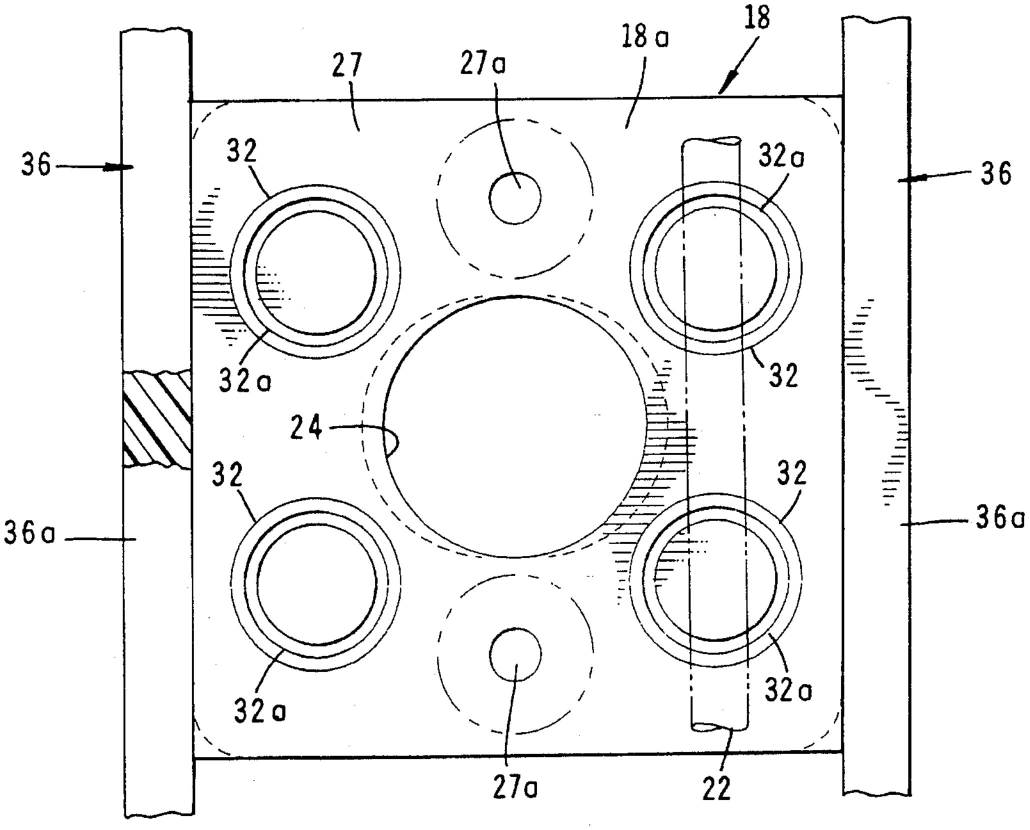

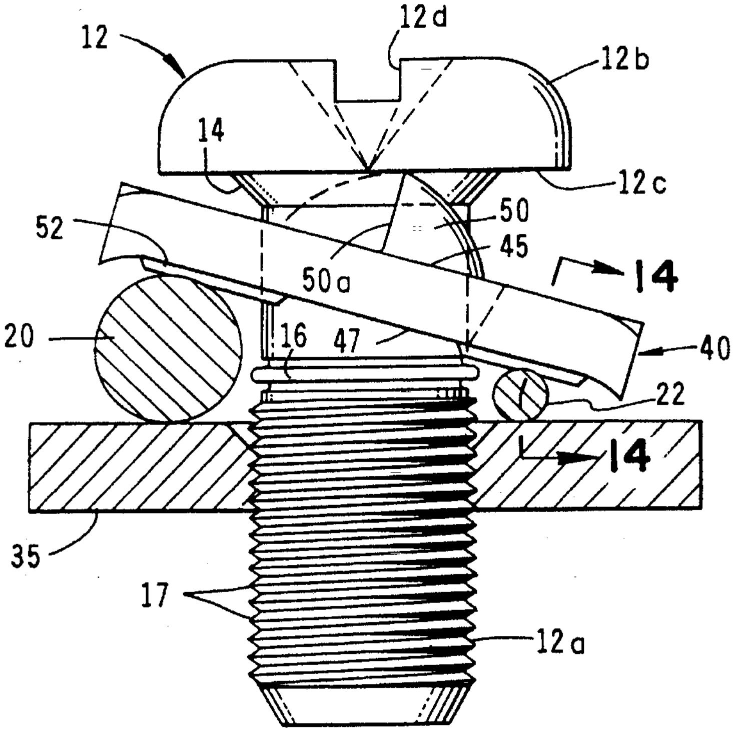
FIG. 8
FIG. 9
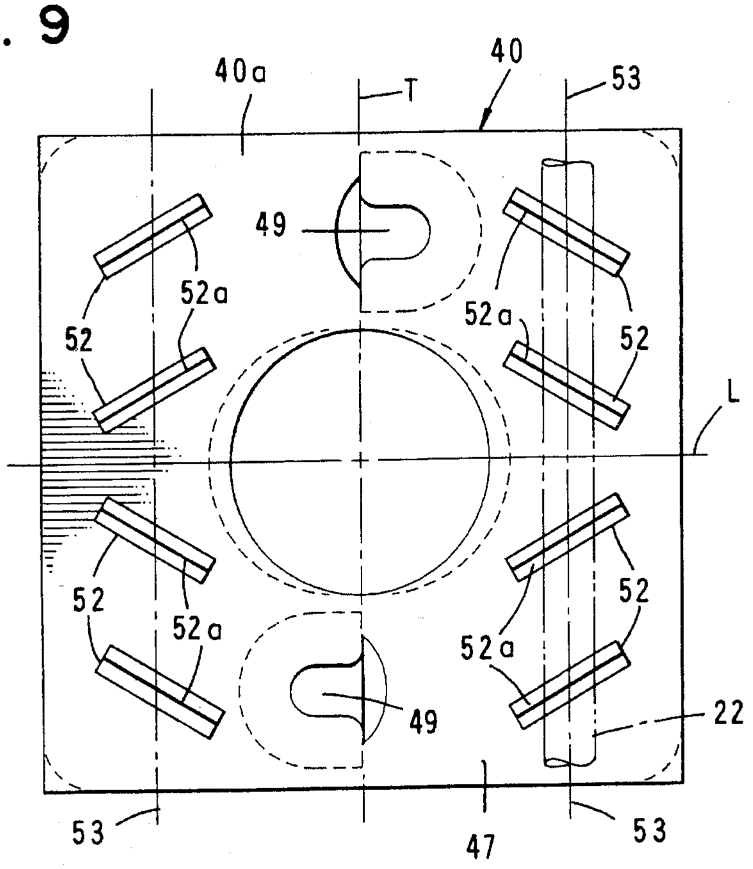

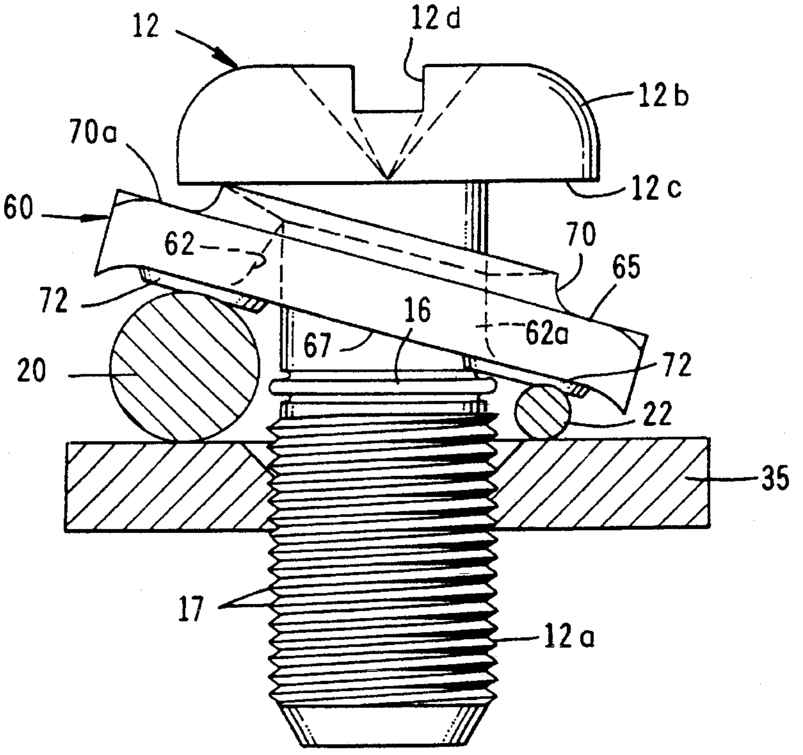
FIG. 15
FIG. 16
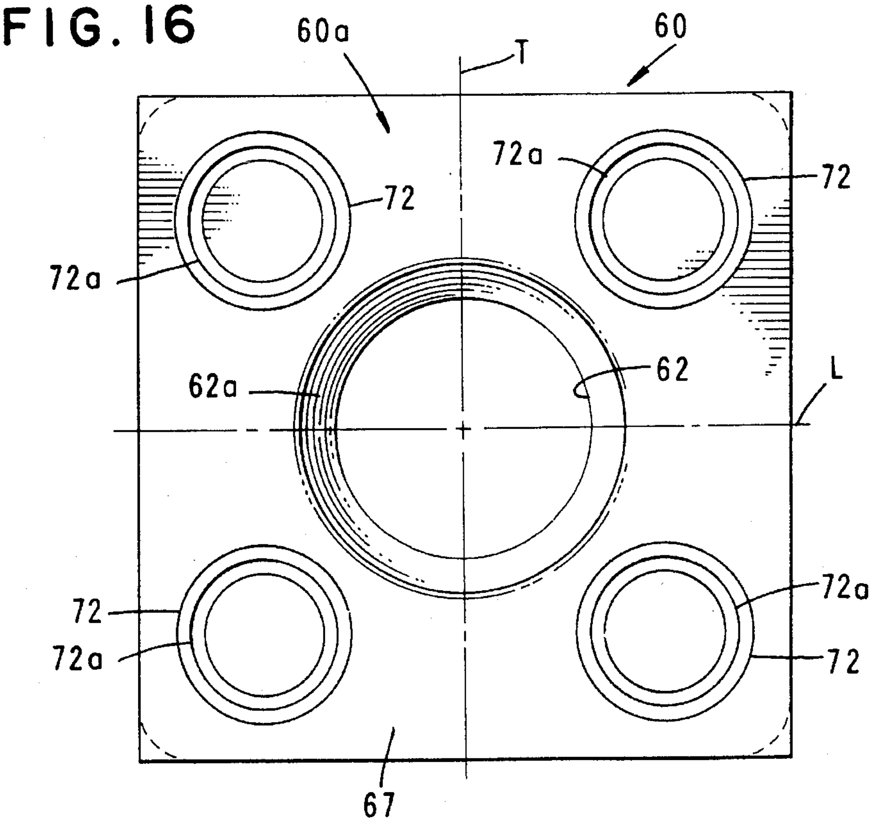

ELECTRICAL CONNECTION TERMINAL ASSEMBLY AND TILT WASHER

BACKGROUND OF THE INVENTION

1. Field of the Invention

The present invention relates generally to terminal clamp assemblies for clamping conductor wires of different sizes to a terminal block. More particularly, the invention concerns an electrical connection terminal assembly that includes a tilt or teetering washer of novel construction that tilts relative to the terminal screw proximate the axial center line thereof.

2. Discussion of the Invention

A number of different types of terminal clamp assemblies have been suggested in the past. Typically, the prior art assemblies comprise a screw and a clamping plate which is loosely mounted on the screw shank for tilting or teetering relative to the shank to accommodate wires of different sizes. Many of the prior art devices incorporate a rib structure at the undersurface of the washer to concentrate a clamping pressure on the conductor wires in an attempt to insure a positive and secure electrical contact.

In certain prior art devices, tiltability of the clamping plate or tilt washer has been achieved by providing a particularly designed clamping surface beneath the head of the screw. U.S. Pat. No. 3,744,012 issued to Gutshall is exemplary of this type of construction. Another prior art construction is described in U.S. Pat. No. 4,310,214 issued to Carlson, wherein a clamp plate or washer is provided with four angularly-spaced, raised embossments which project above the upper surface of the clamp plate for engagement with a circular protrusion formed on the undersurface of the head of the screw. In yet another prior device, which is described in U.S. Pat. No. 3,135,777 issued to Barth, the clamping member is provided with a tube like protuberance which terminates in an edge that engages the undersurface of the screw head and permits the washer to tilt about a location disposed proximate the shank of the terminal screw. Other, more complicated and elaborate terminal connector assemblies, are described in U.S. Pat. No. 3,470,526 issued to Joly and in U.S. Pat. No. 3,081,507 issued to Gribble.

The prior art terminal clamp assemblies typically suffer from one or more shortcomings. For example, some are unduly complex, are difficult to use and are expensive to manufacture. Others lack in reliability in that they do not positively grip wires of different sizes. In this regard most electrical terminal clamp assemblies are subject to Underwriters Laboratory requirements. One of these requirements provides that certain terminal clamp assemblies be capable of grasping a 14 gauge wire on one side of the screw and a 22 gauge wire on the other side of the screw. In order to meet this requirement, the washer must tip or tilt substantially relative to the screw so that both the large and small conductor wires are securely clamped. Because the tilt washers in the prior art devices typically pivot about points located closely adjacent the edge of the shank of the screw and closely adjacent the center of the larger wire, the washer often cannot be effectively forced into secure clamping engagement with the small wires.

The device of the present invention uniquely and elegantly solves most of the problems inherent in the prior art devices by designing the tilt washer in a manner so that it freely tips relative to the undersurface of the screw head at locations proximate the axial center line of the screw. This novel construction enables the washer to tilt in a manner to effectively grip both the large and small diameter wires which are disposed on either side of the axial center line. To enhance the gripping abilities of the washer, the undersurface thereof is provided with uniquely configured and arranged gripping projections which positively and securely grip both the large and small diameter wires.

SUMMARY OF THE INVENTION

It is an object of the present invention to provide a terminal clamping assembly of the character that will simultaneously accommodate and securely grip one or more conductor wires of substantially different diameters.

More particularly, it is an object of the invention to provide an assembly of the aforementioned character which includes a uniquely configured clamping plate or tilt washer which is adapted to tilt freely relative to the undersurface of the screw head proximate the axial center line of the screw so as to move gripping projections provided on the undersurface of the washer into secure clamping engagement with a wire of large diameter disposed on one side of the axial center line of the screw and into positive clamping engagement with a wire of much smaller diameter disposed on the opposite side of the axial center line.

Another object of the invention is to provide an assembly as described in the preceding paragraphs in which the undersurface of the tilt washer is provided with uniquely configured gripping protuberances of various types that provide multiple contact points for firmly gripping the different diameter conductor wires which are disposed on opposite sides of the terminal screw.

Another object of the invention is to provide a terminal connector assembly which is of a simple, straight-forward design and one that can be easily and inexpensively manufactured in large volume.

Another object of the invention is to provide a device of the class described which is easy to use, is automatically and correctly oriented and positively resists loosening even in environments of substantial vibration.

DESCRIPTION OF THE DRAWINGS

FIG. 1 is a side-elevational, partial cross-sectional view illustrating one form of the connector assembly construction of the invention.

FIG. 2 is an enlarged bottom plan view of the wire clamping plate or housing of the washer of FIG. 1 which is disposed within a plastic housing that functions to prevent rotation of the washer during tightening of the terminal screw.

FIG. 8 is a side-elevational, partial cross-sectional view of another form of connector assembly of the present invention.

FIG. 9 is a bottom plan view of the washer of FIG. 8.

FIG. 15 is a side-elevational, cross-sectional view of yet another embodiment of the connector assembly of the invention.

FIG. 16 is a bottom plan view of the washer shown in FIG. 15.

DESCRIPTION OF THE INVENTION

Figure 3:
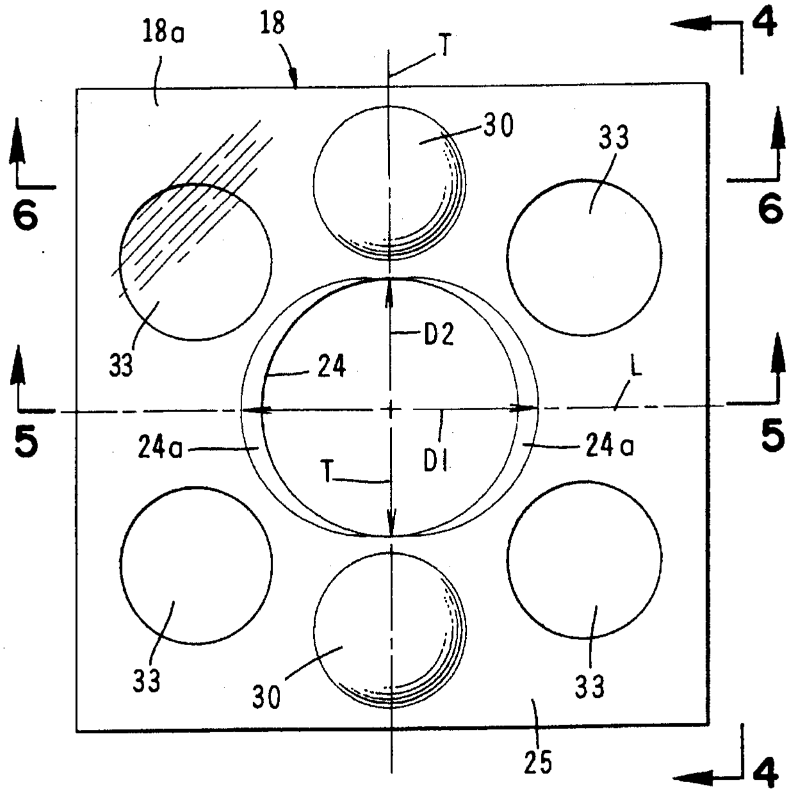
FIG. 3 is a top plan view of the washer of FIG. 1.

Referring to the drawings and particularly to FIGS. 1 through 7, one form of the electrical connector assembly of the present invention is there illustrated. As best seen by referring to FIGS. 1 through 4, this embodiment of the invention comprises a threaded member such as a screw 12 having a shank portion 12*a* and a head portion 12*b*. Head portion 12*b* has a generally flat, annular-shaped undersurface 12*c* and is provided with a tool-engaging slot 12*d*. Slot 12*d* can be a standard screw driver slot, a "Phillips" slot or a combination thereof. A chamfer 14 is formed intermediate surface 12*c* and shank portion 12*a*. Chamfer 14 greatly increases the head to shank strength, especially with "Phillips" head screws. An annular-shaped collar 16, the purpose of which will presently be described, is formed on shank 12*a* at a location above the threaded portion thereof.

Disposed between collar 16 and chamfer 14 is wire clamping means shown here as a clamping plate or tilt washer 18 which is adapted to securely clamp electrical conductors or wires of the same or differing diameters. In FIG. 1, the conductors are shown as a large diameter, solid wire conductor 20 and a small diameter, solid wire conductor 22.

Figure 5:
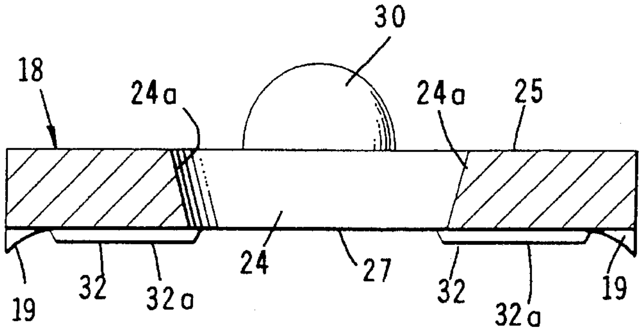
FIG. 5 is a cross-sectional view taken along lines 5—5 of FIG. 3.

As best seen by referring to FIG. 3, washer 18 has a transversely extending center line "T" and a longitudinally extending center line "L" and includes a body portion 18*a* provided with a centrally disposed aperture 24. As indicated in FIG. 5, aperture 24 is provided with a sloping side wall 24*a* that interconnects the upper and lower surfaces of the washer designated in FIG. 5 by the numerals 25 and 27 respectively. As best seen in FIG. 3, at the upper surface of the washer, aperture 24 has a first axis D-1 measured along the longitudinally extending center line of the washer and a second axis D-2 measured along the transversely extending center line of the washer. At the lower surface of the washer, aperture 24 is generally circular. To enable the washer to tilt freely about the upper portion of shank 12*a*, axis D-1 is formed somewhat larger than axis D-2. In the drawings, wall 24*a* is shown as sloping downwardly and inwardly. It is to be understood the walls could slope upwardly as well so as to permit the washer to tilt freely. Additionally, the aperture could also take the form of an elliptical through hole.

Figure 4:
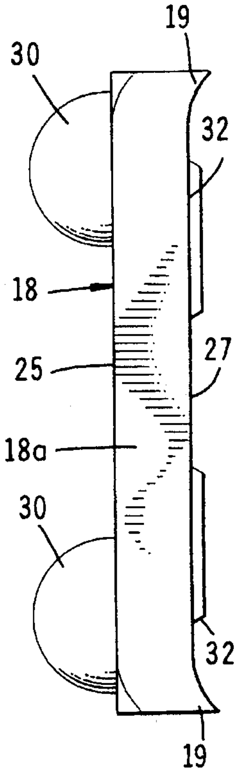
FIG. 4 is a view taken along lines 4—4 of FIG. 3.
Figure 6:
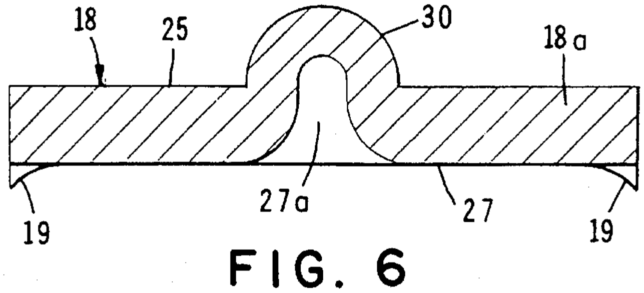
FIG. 6 is a cross-sectional view taken along lines 6—6 of FIG. 3.

Turning particularly to FIGS. 1 and 4, it is to be noted that upper surface 25 of the tilt washer is provided with screw head engaging means about which the body portion of the washer can tilt relative to the head of the screw 12. In the embodiment of the invention shown in FIGS. 1 through 7, this screw head engaging means comprises a pair of transversely, spaced-apart, upstanding protuberances 30 which are disposed on either side of longitudinal center line "L". Turning to FIG. 6, it can be seen that each of the protuberances 30 is formed by an appropriate forming tool which is brought into pressural engagement with the lower surface 27 of the washer at a location 27*a* in a manner to deform or upset the metal acted upon by the forming tool into a generally hemispherical shape of the character shown in the drawings.

Figure 7:
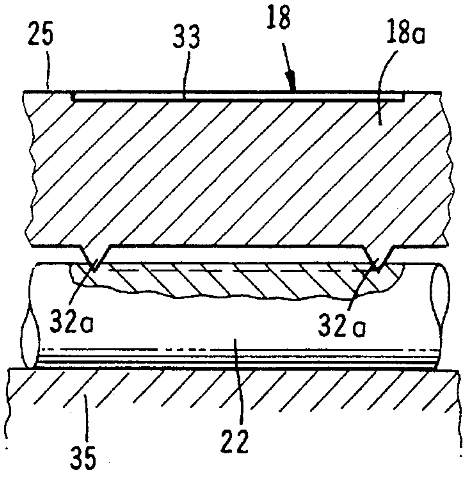
FIG. 7 is a greatly enlarged, fragmentary, cross-sectional view taken along lines 7—7 of FIG. 1.

Provided on the lower surface 27 of the gripping plate, or washer body 18*a*, is gripping means for positively gripping the wire conductors 20 and 22. In the form of the invention shown in FIGS. 1 through 7, the gripping means comprise four spacedapart, generally circular-shape gripping protuberances 32, each of which is provided with a generally circular shaped, upstanding gripping ridge 32*a*. As best seen in FIG. 7, each of the gripping ridges 32*a* terminates in a relatively sharp edge which is adapted to bite into and securely grip the wire conductor with which it is forced into contact. In FIG. 7, the edges of ridges 32*a* are shown partly protruding into the wire. Typically, further tightening of the screw will cause complete penetration of the edges into the wire so as to grip it securely and form a gas tight contact. This feature is important because, in recent years, wire manufactures have, in many cases, eliminated the final anneal making the wires somewhat "stiffer" thereby making it doubly important to generate sufficient clamping pressures to insure a gas tight seal. Ridges 32*a* can have a small radius on the tip and can be formed by various methods well known to those skilled in the art, but preferably are formed by a coining process which deforms the upper and lower surfaces of the washer in the manner illustrated in FIG. 7. (Note circular depressions 33 formed in surface 25 during the coining step.) While various arrangements of wire-engaging gripping protuberances can be formed on the lower surface of the washer, the construction illustrated in the drawings is preferred. In this arrangement, two pair of protuberances are provided on the second surface of the washer, one pair being disposed on one side of the longitudinally extending center line of body 18*a* and the other being disposed on the opposite side of the longitudinally center line. As best seen in FIG. 4, the marginal corners 19 of body 18*a* are downturned. For certain applications, the entire edges of the body can be downturned if desired.

Turning once again to FIGS. 1 and 2, in manufacturing the electrical connector assembly of the form of the invention there shown, the unthreaded shank of a semi-finished screw member is initially inserted through aperture 24 of the completely formed washer 18. The annular collar 16, along with the threads 17, are then preferably formed on the shank of the screw member by a rolling process of the character well known to those skilled in the art. As indicated in the drawings, the diameter of annular collar 16 is slightly larger than the diameter of aperture 24 so that the washer will be held captive between the collar and the undersurface 12*c* of the screw head. Due to the generally elliptical configuration of aperture 24, washer 18 is free to tilt or tip relative to the screw. Stated another way, when, during tightening of the screw, the head engaging means, or dome members 30, are forced into engagement with the undersurface 12*c* of the screw head, the washer remains free to tilt relative to the screw as the members move relative to the undersurface 12*c* of the screw head (see FIG. 1). Unlike the prior art constructions, wherein the tilt washers typically pivot about points located closely adjacent to the shank of the screw, the tilt washer of the present invention is uniquely adapted to tilt about points located much closer to the center of the screw.

With the construction thus described, prior to tightening the screw to the terminal 35 (FIG. 1), the conductor wires 20 and 22 are inserted between the terminal and the washer in the manner shown in FIGS. 1, 2 and 7 so that the wires span the gripping protuberances. As the screw is tightened relative to the terminal, the screw head engaging means, or protuberances 30, move into engagement with the undersurface 12*c* of the screw head and one pair of gripping means move into engagement with the larger diameter electrical conductor 20. Continued tightening of the screw will cause the washer to tilt or pivot relative to undersurface 12*c* of the screw head in the manner shown in FIG. 1. As the washer tilts, the second pair of gripping protuberances move into gripping engagement with the smaller diameter electrical conductor 22. A continued tightening of the screw will then cause the washer to bite into and securely grip both the larger diameter and smaller diameter electrical conductors. As indicated in FIG. 2, in one form of the invention, the terminal block includes means for preventing rotation of the washer as the screw is rotated. This means is here provided in the form of a plastic housing 36 which surrounds the assemblage comprising the screw 12 and the washer 18. Housing 36 includes upstanding walls 36*a* which engage the edges of the washer to prevent it from rotating during the tightening of the screw. While a housing 36 is not required in all cases, for certain applications the provision of means for blocking rotational movement of the washer may be desirable. This rotation preventing means can take several forms so long as the washer is blocked from rotating about the shank of the screw.

Turning now to FIGS. 8 through 14, another form of the electrical connector assembly of the present invention is there illustrated. This form of the invention is similar in many respects to that shown in FIGS. 1 through 7 and like numbers have been used to identify like elements. For example, this embodiment of the invention also includes a threaded member or screw 12 having the same general configuration previously described.

Disposed between collar 16 and chamfer 14 of the screw is wire clamping means shown here as a clamping plate or tilt washer 40 which is of slightly different construction than previously described washer 18.

Figure 10:
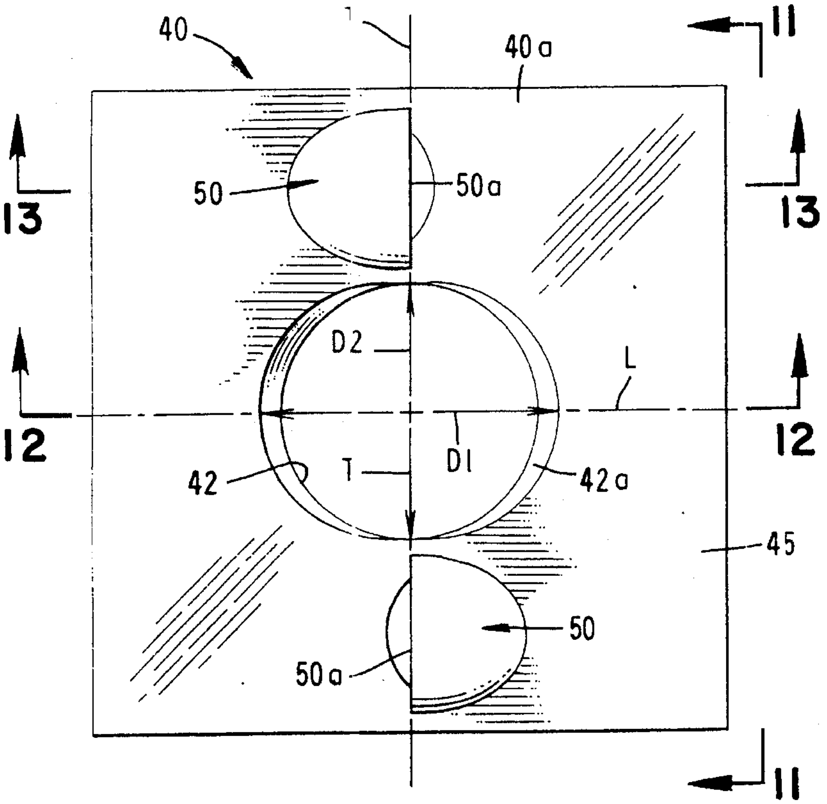
FIG. 10 is a top plan view of the washer of FIG. 8.

As best seen by referring to FIG. 10, washer 40 has a transversely extending center line "T" and a longitudinally extending center line "L" and includes a body portion 40*a* having a centrally disposed aperture 42. As before, aperture 42 is provided with a sloping side wall 42*a* that interconnects the upper and lower surfaces of the washer designated in FIG. 8 by the numerals 45 and 47 respectively. As indicated in FIG. 9, aperture 42 has a first diameter or axis D-1 measured along the longitudinal center line of the washer and a second diameter or axis D-2 measured along the transverse center line of the washer. To enable the washer to tilt, D-1 is once again larger than D-2.

Figure 11:
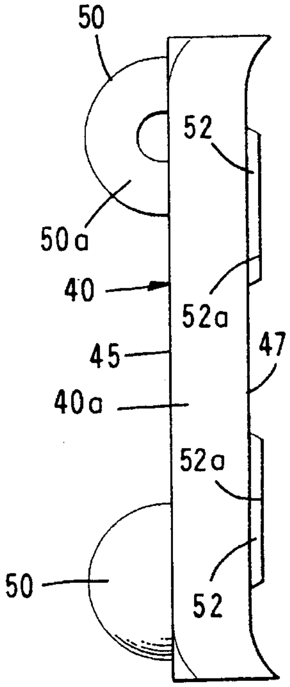
FIG. 11 is a view taken along lines 11—11 of FIG. 10.
Figure 12:
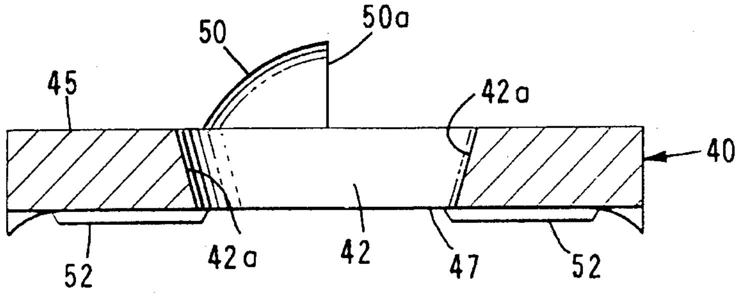
FIG. 12 is a cross-sectional view taken along lines 12—12 of FIG. 10.
Figure 13:
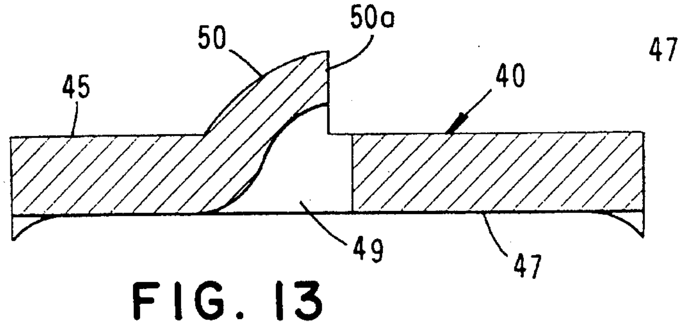
FIG. 13 is a cross-sectional view taken along lines 13—13 of FIG. 10.

Turning particularly to FIGS. 8, 11 and 13, it is to be noted that upper surface 45 of the tilt washer is provided with screw head engaging means of a slightly different configuration from those previously described. More particularly, in this latest embodiment of the invention, the screw head engaging means comprises a pair of transversely, spaced-apart, lanced out protuberances 50 which are disposed on either side of longitudinal center line "L" of the washer. Protuberances 50, which are generally "S" shaped in cross section, are formed by an appropriate forming tool which is brought into pressural engagement with the lower surface 47 of the washer at locations 49 in a manner to lance the metal in the area of the forming tool into the configuration shown in the drawings. Each protuberance 50 terminates in an arcuate line 50*a* which is generally in alignment with transversely extending center line "T".

Figure 14:
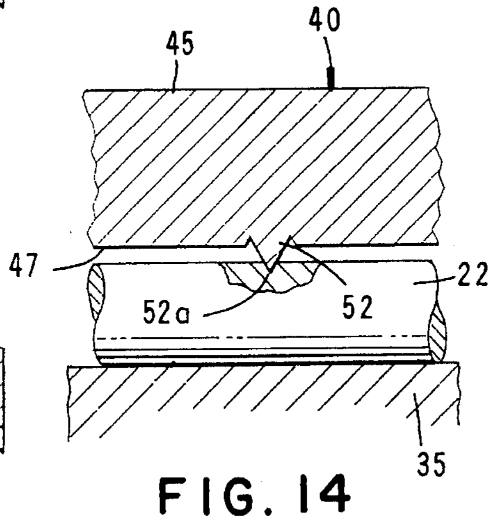
FIG. 14 is a greatly enlarged, fragmentary view taken along lines 14—14 of FIG. 3.

Provided on the lower surface 47 of the gripping plate, or washer body 40*a* is gripping means for gripping the wire conductors 20 and 22. In the form of the invention shown in FIGS. 8 through 14, the gripping means comprise a plurality of spaced-apart gripping members 52 which are disposed at an angle with respect to transverse lines 53 extending generally parallel to center line "T" (FIG. 9). As can be seen by also referring to FIGS. 11 and 14, each of the gripping members 52 is provided with an upstanding gripping ridge 52*a* which terminates in a relatively sharp edge that is adapted to securely grip and slightly penetrate the wire conductor with which it comes into contact (FIG. 14). Gripping members 52 can be formed in any suitable manner well known to those skilled in the art, but preferably are, once again, formed by a suitable coining process. While the gripping members can be arranged on the lower surface of the washer in various ways, the construction illustrated in FIG. 9, wherein four transversely spaced, angularly extending clamping members are provided on either side of the transversely extending center line of the washer body, has proven satisfactory for tightly gripping the conductor wires.

Turning once again to FIG. 8, washer 40 can be seen to be held captive between annular collar 16 and the undersurface 12*c* of the screw head 12*b* and because of the configuration of aperture 42, is free to tip or tilt relative to the screw in the manner shown in the drawings. As before, during tightening of the screw, the screw head engaging means, or upper extremities of protuberances 50, have moved into engagement with the undersurface 12*c* of the screw head and the washer is free to tilt relative to the undersurface 12*c* of the screw head. With the conductor wires 20 and 22 inserted between the terminal block and the washer in the manner shown in FIGS. 8 and 14 and spanning the gripping means or members 52, tightening of the terminal screw relative to the terminal block will cause the washer to tilt in a manner to move members 52 into secure gripping engagement with both the large and small wire conductors. At the same time, the upper edges of the half dimple shaped protuberances 50 will slightly dig into the undersurface of the screw head in a manner to impede loosening of the screw.

Referring to FIGS. 15 through 19, another form of the electrical connector assembly of the present invention is there illustrated. This form of the invention is also similar in many respects to that shown in FIGS. 1 through 7 and like numbers have been used to identify like elements. This embodiment of the invention also includes a threaded member or screw 12 having the same general configuration previously described but does not have the chamfer 14. Disposed between collar 16, and the undersurface of the screw head is wire clamping means shown here as a clamping plate or tilt washer 60 which is of slightly different construction than previously described washers 18 and 40.

Figure 17:
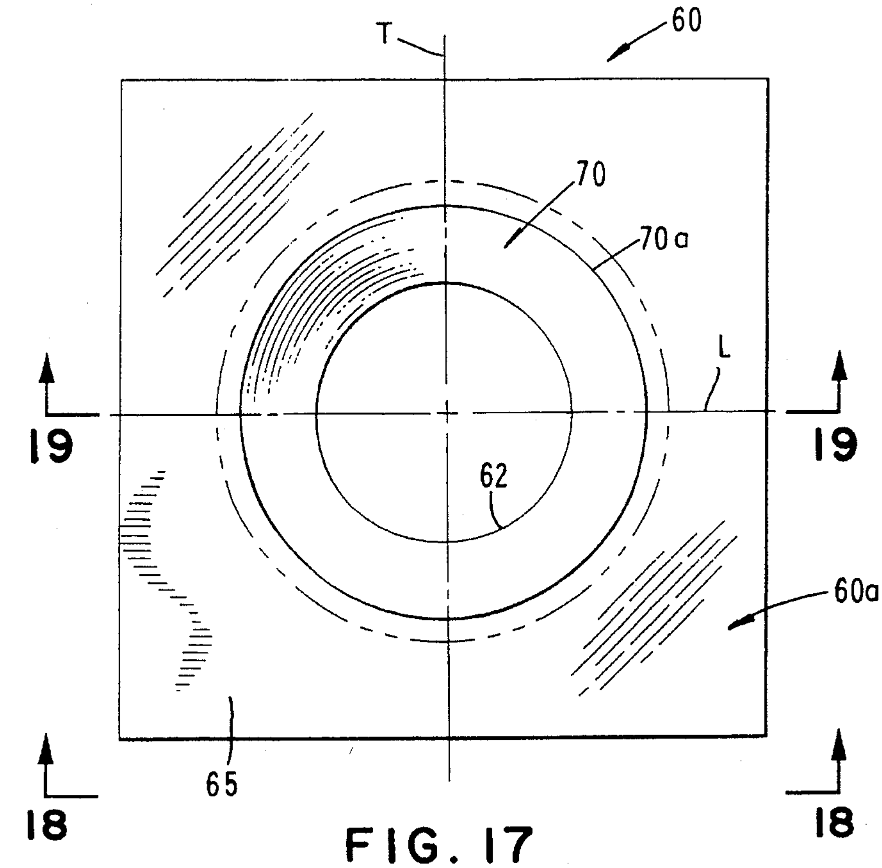
FIG. 17 is a top plan view of the washer of FIG. 15.

As best seen by referring to FIG. 17, washer 60 has a transversely extending center line "T" and a longitudinally extending center line "L" and includes a body portion 60*a* having a centrally disposed, generally circular aperture 62. As before, aperture 62 is provided with a sloping side wall 62*a* that interconnects the upper and lower surfaces of the washer designated in FIG. 15 by the numerals 65 and 67 respectively.

Figure 18:
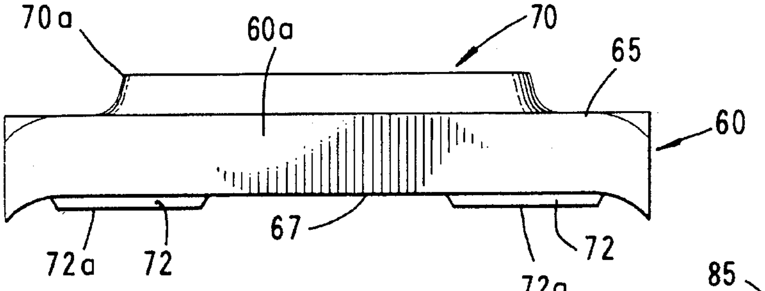
FIG. 18 is a view taken along lines 18—18 of FIG. 17.
Figure 19:
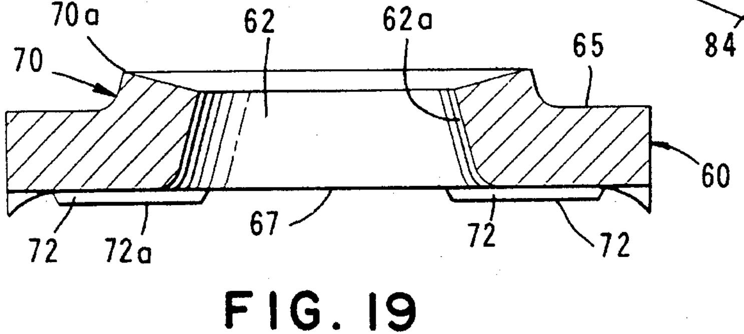
FIG. 19 is a cross-sectional view taken along lines 19—19 of FIG. 17.

Turning particularly to FIGS. 15, 18 and 19, it is to be noted that upper surface 65 of the tilt washer is provided with screw head engaging means of a slightly different configuration from those previously described. More particularly, in this latest embodiment of the invention the screw head engaging means comprises an upstanding collar like protuberance 70 which is concentric with aperture 62. Protuberance 70 is generally annular shaped and terminates in an upper, circular rim 70*a* (FIG. 19) which is adapted to engage undersurface 12*c* of the screw head as the washer tilts in the manner shown in FIG. 15.

Provided on the lower surface 67 of the gripping plate, or washer body 60*a*, is gripping means for positively gripping the wire conductors 20 and 22. In this latest form of the invention, the gripping means are similar to those shown in FIG. 1 through 7 and comprise four spaced-apart, generally circular-shape gripping protuberances 72, each of which is provided with a generally circular shaped, upstanding gripping ridge 72*a*. As best seen in FIGS. 7, 16 and 19, each of the gripping ridges 72*a* terminates in a relatively sharp edge which is adapted to bite into and securely grip the wire conductor with which it is forced into contact. Ridges 72*a* can be formed by various methods well known to those skilled in the art but, as before, are formed by a coining process. While various arrangements of wire gripping protuberances can be formed on the lower surface of washer 60, the construction illustrated in the drawings is preferred. In this arrangement, two pair of protuberances are provided on the second surface of the washer, one pair being disposed on one side of the longitudinally extending center line of body 60*a* and the other being disposed on the opposite side of the longitudinally center line. As best seen in FIG. 15, the corners of body 60*a* are once again downturned.

Turning again to FIG. 15, washer 60 can be seen to be held captive between annular collar 16 and the undersurface 12*c* of the screw had 12*b* and because of the sloping side wall of aperture 62, and collar 70 is free to tilt relative to the screw shank. As before, during tightening of the screw, the screw head engaging means, or upper rim of protuberance 70 moves into engagement with the undersurface 12*c* of the screw head and the washer is free to tilt in the manner shown in FIG. 15.

With the conductor wires 20 and 22 inserted between the terminal block and the washer in the manner shown in FIG. 15 and the conductor wires spanning the gripping means, or members 72, tightening of the terminal screw relative to the terminal block will cause the washer to tilt in a manner to move members 72 into secure gripping engagement with both the large and small wire conductors.

Figure 20:
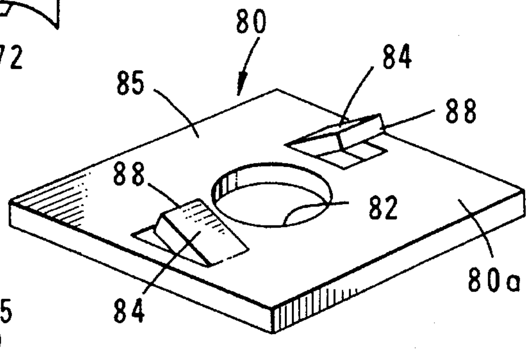
FIG. 20 is a generally perspective view of still another form of tilt washer of the invention.

Turning lastly to FIG. 20, still another form of tilt washer of the invention is there shown and generally designated by the numeral 80. this washer has a body 80*a* which is provided with a generally elliptical central aperture 82. The fulcrum means provided on this washer comprise a pair of spaced-apart, angularly upwardly extending, lanced-out tabs or members 84. Members 84 extend upwardly at an angle with respect to the upper surface 85 of the washer and terminate in relatively sharp edges 88 which are adapted to engage and bite into the undersurface of the screw head as the washer tilts relative to the screw head in the manner previously described herein. Edges 88 are constructed and arranged so that the washer can freely tilt relative to the screw head in the manner previously described and, when the screw is completely tightened, tend to resist loosening thereof.

It is to be understood that the screw head engaging means can also be of a variety of other configurations. For example, it can comprise dimples, half dimples or can comprise an upstanding collar having a sharply inclined wall terminating in a circular ridge.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A washer for use in connection with a screw having a shank portion having a longitudinal axis and a head portion, including an undersurface, said washer comprising:

(a) a body having a transverse center line, a longitudinal center line, a first surface and a second surface, said body having a centrally disposed aperture for receiving the shank of the screw and being pivotable generally about the longitudinal axis of the screw;

(b) screw head engaging means provided on said first surface substantially along said transverse center line for engaging the undersurface of the screw head upon tightening the screw; and (c) gripping means provided on said second surface for gripping an article below said second surface, said gripping means being disposed on either side of said transverse center line of said body and being substantially coplanar.

2. A washer as defined in claim 1 in which said screw head engaging means comprise an upstanding protuberance provided on said first surface of said body.

3. A washer as defined in claim 1 in which said gripping means comprises an article gripping ridge provided on said second surface of said body.

4. A washer for use in connection with a screw having a shank portion and a head portion, including an undersurface, said washer comprising:

(a) a body having a transverse center line, a longitudinal center line, a first surface and a second surface, said body having a centrally disposed aperture for receiving the shank of the screw, said aperture having a first axis measured along said longitudinal center line and a second axis measured along said transverse center line, said second axis being less than said first axis;

(b) screw head engaging means provided on said first surface for engaging the undersurface of the screw head upon tightening the screw; and (c) gripping means provided on said second surface for gripping an article below said second surface, said gripping means being disposed on either side of said transverse center line of said body and comprising a generally circular shaped article gripping ridge provided on said second surface of said body.

5. A washer as defined in claim 4 in which said gripping means comprises at least two upstanding article gripping ridges provided on said second surface of said body.

6. A washer as defined in claim 5 in which two pair of ridges are provided on said second surface of said body, one said pair of ridges being disposed on one side of said transverse center line of said body and the other said pair of ridges being disposed on the opposite side of said transverse center line.

7. A washer as defined in claim 6 in which said screw head engaging means comprises a pair of upstanding protuberances provided on said first surface of said body, said protuberances being movable into engagement with the undersurface of the head of the screw.

8. A washer as defined in claim 7 in which said protuberances are generally dome shaped.

9. A washer as defined in claim 7 in which said protuberances extend angularly upwardly from said first surface of said body.

10. A washer as defined in claim 7 in which said washer includes down turned corners.

11. A connector assembly to which electrical wires can be detachably connected said connector assembly including a threaded terminal and comprising:

(a) a threaded member having a shank portion and a head portion, said head portion having a generally flat annular shaped undersurface;

(b) a clamping plate having a transverse center line, longitudinal center line, a first surface and a second surface, said clamping plate having a centrally disposed, aperture for receiving said shank portion of said threaded member, said aperture being generally elliptical in shape and having a first axis measured along said longitudinal center line and a second axis measured along said transverse center line, said first axis being larger than said second axis;

(c) head engaging means provided on said first surface for engaging the undersurface of said head portion upon tightening said threaded member relative to the terminal; and (d) gripping means provided on said second surface for gripping an article placed between said clamping plate and the terminal, said gripping means comprising protuberances disposed on either side of said transverse center line of said clamping plate, each of said protuberances including a generally circularly shaped ridge adapted to engage the electrical wires at spaced apart locations.

12. A connector assembly as defined in claim 11 including means for preventing rotation of said washer during rotation of said screw.

13. A connector assembly to which electrical wires can be detachably connected, said connector assembly including a threaded terminal and comprising:

(a) a threaded member having a shank portion and a head portion;

(b) a clamping plate having a transverse center line, a longitudinal center line, a first surface and a second surface, said clamping plate having a centrally disposed aperture for receiving said shank portion of said threaded member; and (c) gripping means provided on said second surface of said clamping plate for gripping an article placed between said clamping plate and the terminal, said gripping means comprising generally circular shaped protuberances.

14. A connector assembly as defined in claim 13 further including head engaging means provided on said first surface of said clamping plate for engaging said head portion upon tightening said threaded member relative to the terminal.

15. A connector assembly as defined in claim 14 in which said aperture is generally elliptical in shape having a first axis measured along said longitudinal center line and a second axis measured along said transverse center line, said first axis being larger than said second axis.

16. A connector assembly as defined in claim 14 in which said head engaging means comprises a pair of upstanding, generally hemispherically shaped protuberances provided on said second surface of said clamping plate.

17. A connector assembly as defined in claim 14 in which said gripping means comprises generally circular shaped protuberances disposed on either side of said transverse center line of said clamping plate.

18. A connector assembly to which electrical wires can be detachably connected comprising:

(a) a threaded member having a shank portion and a head portion, said head portion having a generally flat undersurface;

(b) a clamping plate having a transverse center line, a longitudinal center line, a first surface and a second surface, said clamping plate having a centrally disposed aperture for receiving said shank portion of said threaded member;

(c) head engaging means provided on said first surface for engaging said undersurface of said head portion; and (d) gripping means provided on said second surface for gripping an article placed below said second surface, said gripping means comprising generally circular shaped gripping protuberances disposed on either side of said transverse center line of said clamping plate.

19. A connector assembly to which electrical wires can be detachably connected comprising:

(a) a threaded member having a shank portion and a head portion, said head portion having a generally flat undersurface;

(b) a clamping plate having a transverse center line, longitudinal center line, a first surface and a second surface, said clamping plate having a centrally disposed aperture for receiving said shank portion of said threaded member;

(c) head engaging means provided on said first surface for engaging the undersurface of said head portion, said head engaging means comprising an upstanding, generally annular shaped collar provided on said first surface of said clamping plate; and (d) gripping means provided on said second surface for gripping an article placed below said second surface, said gripping means comprising gripping protuberances disposed on either side of said transverse center line of said clamping plate.

20. A connector assembly to which electrical wires can be detachably connected comprising:

(a) a threaded member having a shank portion and a head portion, said head portion having a generally flat undersurface;

(b) a clamping plate having a transverse center line, longitudinal center line, a first surface and a second surface, said clamping plate having a centrally disposed, generally elliptically shaped aperture for receiving said shank portion of said threaded member;

(c) head engaging means provided on said first surface for engaging the undersurface of said head portion; said head engaging means comprising a pair of upstanding, generally hemispherically shaped protuberances provided on said second surface of said clamping plate; and (d) gripping means provided on said second surface for gripping an article placed below said second surface, said gripping means comprising generally circular shaped gripping protuberances disposed on either side of said transverse center line of said clamping plate.

21. A connector assembly to which electrical wires can be detachably connected said connector assembly including a threaded terminal and comprising:

(a) a threaded member including a shank portion and a head portion, said head portion having a generally flat annular shaped undersurface;

(b) a clamping plate having a transverse center line, longitudinal center line, a first surface and a second surface, said clamping plate having a centrally disposed, aperture for receiving said shank portion of said threaded member, said aperture being generally elliptical in shape and having a first axis measured along said longitudinal center line and a second axis measured along said transverse center line, said first axis being larger than said second axis;

(c) head engaging means provided on said first surface for engaging the undersurface of said head portion upon tightening said threaded member relative to the terminal, said head engaging means comprising a pair of upstanding protuberances extending angularly upwardly from said first surface; and (d) gripping means provided on said second surface for gripping an article placed between said clamping plate and the terminal, said gripping means comprising protuberances disposed on either side of said transverse center line of said clamping plate.

22. A connector assembly to which electrical wires can be detachably connected, said connector assembly comprising:

(a) a threaded member including a shank portion having a longitudinal axis;

(b) a clamping plate having a transverse center line, a longitudinal center line, a first surface and a second surface, said body having a centrally disposed aperture for receiving said shank portion of said threaded member, said clamping plate being tiltable about said longitudinal axis of said threaded member from a first position to a second position; and (c) gripping means provided on said second surface of said clamping plate for gripping an electrical wire, said gripping means comprising gripping elements having gripping portions disposed in a substantially coplanar relationship.

23. A connector assembly as defined in claim 22 in which said threaded member further includes a head portion having an undersurface, said connector assembly further including head engaging means provided on said first surface of said clamping plate for engaging said head portion, said screw head engaging means being disposed substantially along said transverse center line of said clamping plate.

24. A connector assembly as defined in claim 22 in which said gripping means comprise wire engaging ridges for gripping electrical wires placed between said clamping plate and the terminal, said article engaging ridges residing in a single plane.

25. A connector assembly as defined in claim 24 in which said wire engaging ridges are provided on a plurality of protuberances extending from said second surface of said clamping plate.

26. A connector assembly as defined in claim 24 in which said clamping plate includes down turned corners.

27. A connector assembly to which electrical wires can be detachably connected, said connector assembly comprising:

(a) a threaded member including a shank portion having a longitudinal axis;

(b) a clamping plate having a transverse center line, a longitudinal center line, a first surface and a second surface, said body having a centrally disposed aperture for receiving said shank portion of said threaded member, said clamping plate being tiltable about said longitudinal axis of said threaded member from a first position to a second position; and (c) gripping means provided on said second surface of said clamping plate for gripping an electrical wire, said gripping means comprising at least one gripping element disposed on each side of said transverse center line of said clamping plate, one of said gripping elements having a wire engaging portion disposed substantially within a first plane and the other of said elements having a wire engaging portion disposed substantially within a second plane parallel to said first plane.

28. A connector assembly as defined in claim 18 in which said undersurface of said clamping plate is generally perpendicular to said longitudinal axis of said threaded portion when said clamping plate is in a starting configuration and in which said first and second planes are generally parallel to said undersurface of said clamping plate when said clamping plate is in the starting configuration.

* * * * *